…

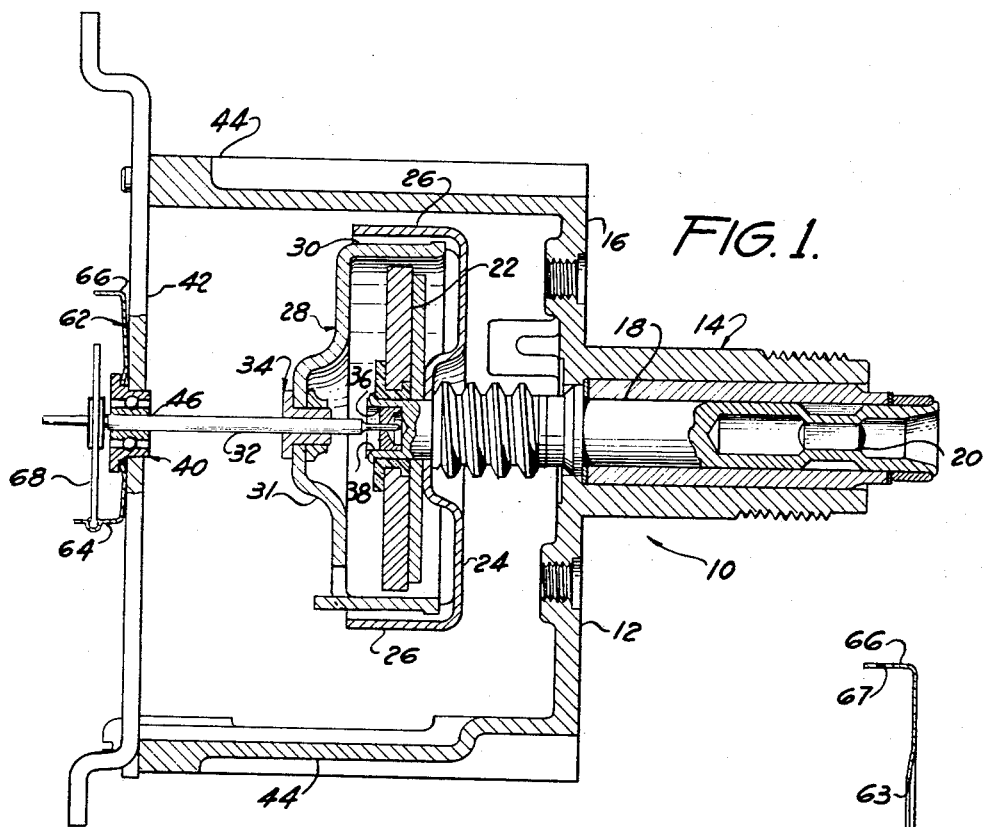

United States Patent Office 3,330,162
Patented July 11, 1967

3,330,162
SPEEDOMETER BEARING STRUCTURE
Patrick Lee Powell, Franklin Park, Ill., assignor to Stewart-Warner Corporation, Chicago, Ill., a corporation of Virginia
Filed Sept. 28, 1964, Ser. No. 399,693
4 Claims. (Cl. 73—496)

This invention relates in general to tachometer or speedometer bearing structures and more particularly to an arrangement for simply and economically damping extraneous vibrations and for limiting the axial thrust of the pointer shaft of a tachometer or speedometer.

Present day speedometers generally utilize a permanent magnet which is driven at a speed corresponding to vehicle movement from a flexible shaft extending to the vehicle transmission or other drive apparatus. The magnet is encircled by a speed cup in which eddy currents are induced by the rotation of the magnet. The speed cup, therefore, responds to the speed of rotation of the magnet to rotate a pointer carried by the speed cup shaft to a position corresponding to the vehicle speed. If used as a tachometer, the input to the magnet corresponds to the engine speed.

The speed cup is generally biased into a normal or home position by a spiral biasing spring and rotation of the speed cup occurs against the tension of the biasing spring. The tension of the spring is adjusted in accordance with the position of a spring regulator connected to one end of the biasing spring and this serves to set the home or normal position of the pointer. While the described arrangement is basically simple and economical, certain problems arise since apparently extraneous vibrations are transmitted from the vehicle carriage to the speedometer housing and supply additional torque to the speed cup which in turn causes the pointer to provide a false reading. This problem is especially severe in motorcycles and tracked vehicles which are subject to considerable undamped vibration of comparatively high frequency.

It is, therefore, one object of the present invention to provide an improved bearing structure for damping the effect of extraneous vibrations on a speedometer or tachometer pointer to prevent false indications of vehicle or engine speed.

This objective is achieved in a very simple and unique manner by applying a coating of silicone fluid to a ball bearing structure supporting one end of the speed cup shaft. The silicone fluid forms a coating of very minute dimension on the surface of the balls and the recesses of the races and adheres thereto so that the need and difficulty of providing special sealing apparatus to prevent the loss of fluid is avoided. The fluid in turn serves to damp the application of extraneous or ambient vibrations to the speed cup shaft and pointer.

While other damping arrangements have been tried in the past as typified by the copending application, Ser. No. 249,714 filed by Jensen, in which a packing of silicone fluid was used, the packing required a retaining cap or other device for preventing the loss of fluid. It has been found, however, that the present arrangement permits retention of a layer of silicone fluid of sufficient volume to provide damping for extraneous or ambient vibrations and reduce the effect thereof on the speedometer needle without the need for special retaining devices.

In addition, the speed cup shaft is mounted coaxially with the shaft of the magnet and one end of the speed cup shaft is journalled in a bearing carried by the magnet shaft. This, of course, presents some problem since the speed cup shaft end or axial play must be limited so that it does not pound against the magnet shaft or bearing, but at the same time must not be end loaded against the magnet shaft to prevent end play.

It is, therefore, another object of the present invention to provide an improved arrangement for mounting the speed cup shaft to permit a more facile assembly of the speed cup shaft while limiting its end play to a predetermined value.

This objective is also accomplished in a simple, unique manner by press fitting the ball bearing structure which carries the damping fluid described above into a mounting plate. The bearing structure is press fit on the speed cup shaft at a known position so that when it is inserted in the mounting plate and pressed home against the plate it provides a desired clearance from the magnet shaft.

Other objects and features of the present invention will become apparent on examination of the following specification and claims together with the drawings, wherein:

FIG. 1 is a sectional view illustrating pertinent portions of the speedometer assembly incorporating the principles of the present invention;

FIG. 2 is a somewhat enlarged view illustrating the manner in which the speed cup shaft and bearing structure are related; and FIG. 3 is a side sectional view of the spring regulator.

Referring to FIG. 1, a portion of speedometer assembly is indicated therein by the reference character 10. The assembly 10 comprises a yoke frame member 12 having an externally threaded boss 14 extending from the back leg 16 of the frame 12 to permit the assembly 10 to be suitably connected to a flexible shaft sheath.

A magnet shaft 18 is journalled in the boss 14 and it has a recess 20 at one end for receiving the end of a flexible shaft for rotating a permanent magnet 22 at the other end of the magnet shaft 18. A field compensator 24 is mounted coaxially behind a magnet 22 on shaft 18, and it has end flanges 26 extending past and spaced apart from the ends of magnet 22 to control the magnetic circuit extended by the magnet. Both the magnet 22 and compensator 24 are rotated by the flexible shaft in accordance with the speed of a vehicle in which the speedometer assembly 10 is mounted.

A speed cup 28 having an annular flange 30 interposed between the magnet 22 and the compensator end flanges 26 is adapted to rotatably respond to eddy currents generated therein by magnet 22. The speed cup has a back wall 31 which is fixedly connected to a shaft 32 by means of a conventional coupling structure 34. One end of the shaft 32 is rotatably supported coaxially with the magnet shaft 18 by means of a jewel bearing 36 mounted in a recess 38 at the magnet end of shaft 18. The other end of the shaft 32 is rotatably carried in a ball bearing structure 40 supported in a mounting plate 42. The plate 42 is carried between the two arms 44 of the yoke frame.

The bearing structure 40 comprises an inner race 46 which is fixedly connected to shaft 32, and an outer race 48 with plurality of ball bearings 50 being located therebetween in coaxial recesses 52 and 54 in the inner and outer races respectively. A deposit of silicone fluid, indicated at 56, is applied between the races 46 and 48 and the fluid apparently forms in the recesses 52 and 54 as a monolayer or in a very thin film whereafter it resists escape and serves to dampen extraneous or ambient vibrations transmitted to the shaft 32 to prevent false indications by a pointer, not shown, and carried adjacent the left end of shaft 32, as viewed in FIG. 1.

The outer race 46 is peripherally dimensioned so that it can be press fit into a corresponding aperture in the mounting plate 42. The race 46 is also provided with a first shoulder 58 and a second shoulder or flange 60. The space between shoulder 48 and flange 50 is chosen to accommodate a spring regulator 62 of known thickness, and permit the spring regulator to be frictionally clamped between flange 60 and the mounting plate 42. It may then be rotated about the axis of shaft 32 to a desired position and held therein.

The race 46 is press fit on the shaft 32 to a position corresponding to a desired distance between the shoulder 58 and the end of shaft 32 fitted into bearing 38 to ensure that the end of shaft 32 will be supported in bearing 38 without striking or binding, when shoulder 58 is pressed home against the plate 42 despite variations in thickness or spacing of the plate 42.

The spring regulator 62 is provided with a conventional central aperture 63 to permit its receipt over shoulder 58. It is also provided with conventional projecting arms 64 and 66 at opposite ends thereof. The arm 64 is conventionally split and formed to permit connection to one end of a spiral torsion spring 68 whose other end is connected to the shaft 32. The shaft 32 is then normally held in position unless rotated therefrom as a result of eddy currents induced in the speed cup 28 in response to rotation of the magnet 22. The other arm 66 is provided with an aperture 67 in which a tool is conventionally inserted for adusting the position of the spring regulator 62 relative to the shaft 32 and thereby control the spiral spring 68 to bring the pointer (not shown) into home position in alignment with appropriate indicia on the speedometer dial face, also not shown.

It will be noted that the spring regulator 62 is provided with a concave or spherical form 70 adjacent the edges of aperture 63. The regulator is, therefore, held under at least a desired minimum degree of pressure as the form is pressed against flange 60 in response to the press fitting of the bearing structure 40 into the plate 42 until shoulder 58 engages plate 42. Thus the end of shaft 32, journalled in bearing 36, is spaced slightly from the shaft 18 under normal circumstances while axial end play of the shaft is avoided. A gauge located against the exposed end of shaft 32 may thus be used to indicate that the amount of end play is reduced, while the chosen distance between shoulder 58, for example, on one end of bearings 40 and the end of shaft 32 ensures that at least a minimum clearance 74 will be provided between the end of shaft 32 and shaft 18 or the shoulder 76 and bearing 36.

With the spherical form 70 on the regulator, the regulator is held under tension irrespective of normal differences in tolerances between the position of flange 60 and the mounting plate 42 when the shoulder 58 engages the plate 42.

The foregoing constitutes a description of an improved speed cup mounting whose inventive concepts are believed more fully set forth in the accompanying claims.

What is claimed is:

1. A combination for use with a rotatable magnet adapted to generate eddy currents in a speed cup for rotating said speed cup through an arc dependent on the rate of rotation of said magnet, the improvement comprising a rotatable shaft for supporting said magnet, a bearing carried at one end of said shaft, a shaft fixedly carrying said speed cup and rotatably supported at one end in said bearing, means for biasing said speed cup shaft to resist rotational movement, a mounting plate, a ball bearing structure having inner and outer races with coaxially aligned recesses in which a plurality of ball bearings are seated and said inner race is fixedly connected to said speed cup shaft and said outer race is press fit into said mounting plate for a fixed distance whereby the other end of said speed cup shaft is rotatably supported with the extent of said press fit selected to avoid axial loading between said shafts while avoiding end play of said speed cup shaft, said inner and outer races defining an opening between said races and at opposite ends of said races, a deposit of silicone fluid between said races and in said recesses with said deposit damping extraneous vibrations applied between said mounting place and shaft and retained in said recess irrespective of the openings at opposite ends of said races, and a regulator for said biasing means having a nonplanar section frictionally clamped by said outer race to said mounting plate with said regulator connected to said biasing means for enabling the adjustment of said biasing means by rotation of said regulator in its clamped position, said regulator being clamped irrespective of normal variations in the extent to which said outer race is press fit into said mounting plate.

2. A combination for use with a magnet having a shaft for rotation and adapted to generate eddy currents in a speed cup for rotating said speed cup through an arc dependent on the rate of rotation of said magnet, the improvement comprising a shaft fixedly carrying said speed cup, a mounting plate, a ball bearing structure having inner and outer races with coaxially aligned recesses in which a plurality of ball bearings are seated and said inner race is fixedly connected to said speed cup shaft at a selected position and said outer race press fit into said mounting plate to a fixed distance for rotatably supporting one end of said speed cup shaft without axial engagement of said shafts and with a minimum degree of axial play of said speed cup shaft, and a deposit of silicone fluid between said races and in said recesses to damp the effect on said speed cup shaft of extraneous vibrations transmitted to said mounting plate.

3. A combination for use with a rotatable magnet adapted to generate eddy currents in a speed cup for rotating said speed cup through an arc dependent on the rate of rotation of said magnet, the improvement comprising a rotatable shaft for supporting said magnet, a bearing carried at one end of said shaft, a shaft fixedly carrying said speed cup and rotatably supported at one end in said bearing, means for biasing said speed cup shaft to resist rotational movement, a mounting plate, and a ball bearing structure having inner and outer races between which a plurality of ball bearings are seated and said inner race is fixedly connected to said speed cup shaft at a selected position and said outer race is press fit into said mounting plate for a fixed distance to rotatably support the other end of said speed cup shaft without axial engagement of said shafts, while avoiding axial play of said speed cup shaft.

4. A combination for use with a rotatable magnet adapted to generate eddy currents in a speed cup for rotating said speed cup through an arc dependent on the rate of rotation of said magnet, the improvement comprising a rotatable shaft for supporting said magnet, a bearing carried at one end of said shaft, a shaft fixedly carrying said speed cup and rotatably supported at one end in said bearing, means for biasing said speed cup shaft to resist rotational movement, a mounting plate, a ball bearing structure having inner and outer races between which a plurality of ball bearings are seated and said inner race is fixedly connected to said speed cup shaft at a selected position and said outer race is press fit into said mounting plate for a fixed distance to rotatably support the other end of said speed cup shaft without end play of said speed cup shaft and without axial engagement adapted to be gauged in accordance between said speed cup shaft and said magnet shaft, and a regulator for said biasing means having a spherically shaped section frictionally clamped by said outer race to said mounting plate with said regulator connected to said biasing means for enabling the adjustment of said biasing means by rotation of said regulator in its clamped position, said regulator being thereby clamped irrespective of normal variations in the dimensions of said outer race and the fixed press fit of said outer race into said mounting plate.

(References on following page)

References Cited

UNITED STATES PATENTS

| | | |
|---|---|---|
| 2,456,496 | 12/1948 | Ford et al. |
| 2,884,238 | 4/1959 | Renz _____ 73—519 X |
| 3,240,072 | 3/1966 | Holbrook _____ 73—519 |
| 3,247,724 | 4/1966 | Powell _____ 73—498 X |

RICHARD C. QUEISSER, *Primary Examiner.*

JAMES J. GILL, *Assistant Examiner.*